(12) United States Patent
Kook et al.

(10) Patent No.: US 10,352,405 B2
(45) Date of Patent: Jul. 16, 2019

(54) VEHICULAR MULTI-STAGE TRANSMISSION

(71) Applicants: HYUNDAI MOTOR COMPANY, Seoul (KR); KIA MOTORS CORPORATION, Seoul (KR)

(72) Inventors: Jae Chang Kook, Hwaseong-si (KR); Seong Wook Ji, Gunpo-si (KR); Ju Hyun Park, Suwon-si (KR); Won Min Cho, Hwaseong-si (KR); Hyun Sik Kwon, Seoul (KR); Il Han Yoo, Jeollanam-do (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 88 days.

(21) Appl. No.: 15/811,853

(22) Filed: Nov. 14, 2017

(65) Prior Publication Data

US 2018/0363731 A1    Dec. 20, 2018

(30) Foreign Application Priority Data

Jun. 19, 2017    (KR) .................. 10-2017-0077037

(51) Int. Cl.
*F16H 3/66*    (2006.01)
(52) U.S. Cl.
CPC ....... *F16H 3/66* (2013.01); *F16H 2200/0069* (2013.01); *F16H 2200/0078* (2013.01);
(Continued)

(58) Field of Classification Search
CPC .............. F16H 3/66; F16H 2200/0078; F16H 2200/2012; F16H 2200/2048; F16H 2200/0069; F16H 2200/0091
See application file for complete search history.

(56) References Cited

U.S. PATENT DOCUMENTS 7,686,731 B2 *    3/2010    Raghavan ................. F16H 3/66
                                                              475/276
8,425,370 B2 *    4/2013    Leesch ...................... F16H 3/66
                                                              475/271
(Continued)

FOREIGN PATENT DOCUMENTS

KR    10-2013-0003981 A    1/2013

*Primary Examiner* — Patrick H Mackey
(74) *Attorney, Agent, or Firm* — Brinks Gilson & Lione

(57) ABSTRACT

A vehicular multi-stage transmission includes: input and output shafts; first, second, third and fourth planetary gear devices each including first, second and third rotary elements; and seven shifting elements connected to the rotary elements of the four planetary gear devices. In particular, the second rotary element of the first planetary gear device PG1 is selectively connected to a transmission case by a first shifting element while being selectively connected to the input shaft, and the secondary rotary element of the first planetary gear device is selectively connected to the third rotary element of the second planetary gear device, the first rotary element of the third planetary gear device, and the first rotary element of the fourth planetary gear device. In addition, the third rotary element of the first planetary gear device is fixedly connected to the second rotary element of the second planetary gear device.

11 Claims, 3 Drawing Sheets

Figure 1:
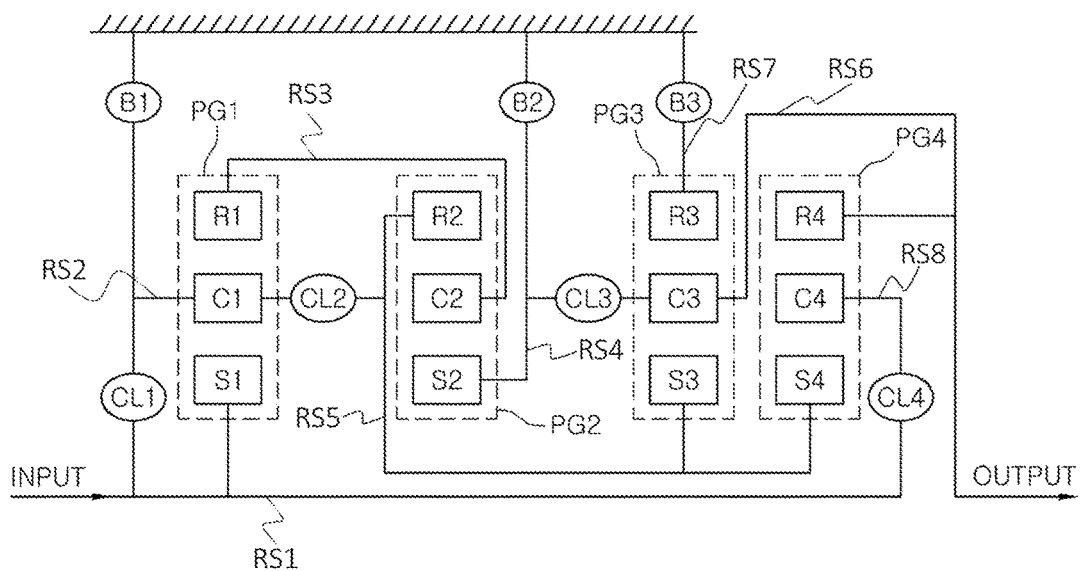

| TRANSMISSION STAGE | CL1 | CL2 | CL3 | CL4 | B1 | B2 | B3 | GEAR RATIO |
|---|---|---|---|---|---|---|---|---|
| 1ST |  | O | O |  |  |  | O | 4.408 |
| 2ND | O | O |  |  |  |  | O | 3.003 |
| 3RD | O |  |  | O |  |  | O | 2.078 |
| 4TH |  |  |  | O |  |  | O | 1.584 |
| 5TH | O |  |  | O | O |  |  | 1.224 |
| 6TH | O | O |  | O |  |  |  | 1.000 |
| 7TH |  | O |  | O | O |  |  | 0.855 |
| 8TH |  | O |  | O |  | O |  | 0.708 |
| 9TH |  |  |  | O | O | O |  | 0.598 |
| 10TH |  |  | O | O |  | O |  | 0.488 |
| R1 |  |  | O |  |  | O | O | -5.438 |

(52) U.S. Cl.
CPC ............ *F16H 2200/0091* (2013.01); *F16H 2200/2012* (2013.01); *F16H 2200/2048* (2013.01)

(56) References Cited

U.S. PATENT DOCUMENTS

| | | | |
|---|---|---|---|
| 8,784,259 B2 * | 7/2014 | Shim .................. | F16H 3/66 475/281 |
| 9,285,014 B2 * | 3/2016 | Lippert ................ | F16H 3/62 |
| 10,047,832 B2 * | 8/2018 | Kim .................... | F16H 3/66 |
| 2016/0312860 A1 * | 10/2016 | Schilder ............. | F16H 3/66 |
| 2018/0073609 A1 * | 3/2018 | Yoshino .............. | F16D 13/52 |
| 2018/0306279 A1 * | 10/2018 | Kook .................. | F16H 3/66 |

* cited by examiner

FIG.3

| TRANSMISSION STAGE | CL1 | CL2 | CL3 | CL4 | B1 | B2 | B3 | GEAR RATIO |
|---|---|---|---|---|---|---|---|---|
| 1ST |  | O | O |  |  |  | O | 4.408 |
| 2ND | O | O |  |  |  |  | O | 3.003 |
| 3RD | O |  |  | O |  |  | O | 2.078 |
| 4TH |  |  |  | O |  |  | O | 1.584 |
| 5TH | O |  |  | O | O |  |  | 1.224 |
| 6TH | O | O |  | O |  |  |  | 1.000 |
| 7TH |  | O |  | O | O |  |  | 0.855 |
| 8TH |  | O |  | O |  | O |  | 0.708 |
| 9TH |  |  |  | O | O | O |  | 0.598 |
| 10TH |  |  | O | O |  | O |  | 0.488 |
| R1 |  |  | O |  |  | O | O | −5.438 |

FIG.4

| TRANSMISSION STAGE | CL1 | CL2 | CL3 | CL4 | B1 | B2 | B3 | GEAR RATIO |
|---|---|---|---|---|---|---|---|---|
| 1ST | | ○ | | | ○ | | ○ | 5.110 |
| 2ND | | ○ | ○ | | | | ○ | 4.408 |
| 3RD | ○ | ○ | | | | | ○ | 3.003 |
| 4TH | ○ | | ○ | | | | ○ | 2.386 |
| 5TH | ○ | | | | ○ | | ○ | 2.078 |
| 6TH | | | | ○ | | | ○ | 1.584 |
| 7TH | ○ | | | ○ | ○ | | | 1.224 |
| 8TH | ○ | ○ | ○ | ○ | | | | 1.000 |
| 8TH | ○ | | ○ | ○ | | | | 1.000 |
| 8TH | ○ | ○ | ○ | | | | | 1.000 |
| 8TH | | ○ | | ○ | | | | 1.000 |
| 9TH | | ○ | | ○ | ○ | | | 0.855 |
| 10TH | | ○ | | ○ | | ○ | | 0.708 |
| 11TH | | | | ○ | ○ | ○ | | 0.598 |
| 12TH | | | ○ | ○ | | ○ | | 0.488 |
| R1 | | | ○ | | | ○ | ○ | -5.438 |
| R2 | | | | | ○ | ○ | ○ | -4.736 |
| R3 | | ○ | ○ | | | ○ | | -0.702 |

VEHICULAR MULTI-STAGE TRANSMISSION

CROSS REFERENCE TO RELATED APPLICATION

This application claims priority to and the benefit of Korean Patent Application No. 10-2017-0077037, filed Jun. 19, 2017, which is incorporated herein by reference in its entirety.

FIELD

The present disclosure relates to a vehicular multi-stage transmission, and more particularly, to a technique for improving the fuel efficiency of a vehicle by implementing as many transmission stages as possible with a simple configuration.

BACKGROUND

The statements in this section merely provide background information related to the present disclosure and may not constitute prior art.

The recent rise in oil prices leads vehicle manufacturers to a more competition to improve fuel efficiency. In the case of engines, efforts are being made to reduce weight and to improve fuel efficiency through technologies such as downsizing.

Meanwhile, among the fuel efficiency improvement methods that can be pursued in a transmission mounted in a vehicle, there is a method for improving fuel efficiency by enabling an engine to operate at a more efficient operating point by multi-staging the transmission.

In addition, multi-staging of such a vehicular transmission may further improve the quietness of the vehicle by enabling the engine to operate in a relatively low RPM zone.

As the number of transmission stages of a transmission increases, the number of internal components constituting the transmission increases, which may deteriorate the mountability, costs, weight, and transmission efficiency of the transmission. Therefore, in order to increase a fuel efficiency through the multi-staging of the transmission, it is important to devise a transmission structure that can increase efficiency with reduced components and a relatively simple structure.

It should be understood the foregoing description of the background art is merely intended to enhance the understanding of the background of the present disclosure and should not be construed as an admission that it is a prior art already known to a person ordinarily skilled in the art.

SUMMARY

The present disclosure provides a vehicular multi-stage transmission, which is capable of improving the fuel efficiency of a vehicle by implementing as many transmission stages as possible with a small number of components and a simple configuration.

In one form of the present disclosure, a vehicular multi-stage transmission includes: an input shaft INPUT and an output shaft OUTPUT; a first planetary gear device PG1, a second planetary gear device PG2, a third planetary gear device PG3, and a fourth planetary gear device PG4, which are configured to transmit torque between the input shaft INPUT and the output shaft OUTPUT, each of the first, second, third and fourth planetary gear devices including first, second and third rotary elements; and seven shifting elements connected to the rotary elements of the planetary gear devices.

The first rotary element of the first planetary gear device PG1 is connected to the second rotary element of the fourth planetary gear device PG4 while being fixedly connected to the input shaft INPUT, the second rotary element of the first planetary gear device PG1 is selectively connected to a transmission case by a first shifting element of the seven shifting elements while being selectively connected to the input shaft INPUT, the secondary rotary element of the first planetary gear device PG1 is selectively connected to the third rotary element of the second planetary gear device PG2, the first rotary element of the third planetary gear device PG3, and the first rotary element of the fourth planetary gear device PG4, and the third rotary element of the first planetary gear device PG1 is fixedly connected to the second rotary element of the second planetary gear device PG2. The first rotary element of the second planetary gear device PG2 is selectively connected to the second rotary element of the third planetary gear device PG3 while being selectively connected to the transmission case by a second shifting element of the seven shifting elements. The second rotary element of the third planetary gear device PG3 is connected to the third rotary element of the fourth planetary gear device PG4 while being fixedly connected to the output shaft OUTPUT, and the third rotary element of the third planetary gear device PG3 is selectively connected to the transmission case by a third shifting element of the seven shifting elements.

The first planetary gear device PG1, the second planetary gear device PG2, the third planetary gear device PG3, and the fourth planetary gear device PG4 may be sequentially arranged along the axial direction of the input shaft INPUT and the output shaft OUTPUT.

The first shifting element selectively connecting the second rotary element of the first planetary gear device PG1 to the transmission case is a first brake B1 among the shifting elements, the second shifting element selectively connecting the first rotary element of the second planetary gear device PG2 to the transmission case is a second brake B2 among the shifting elements, and the third shifting element selectively connecting the third rotary element of the third planetary gear device PG3 to the transmission case is a third brake B3 among the shifting elements. The remaining elements among the seven shifting elements may be provided to form a selective connection between the rotary elements of the four planetary gear devices.

The remaining shifting elements includes first, second, third and fourth clutches. The first clutch CL1 among the shifting elements may form a selective connection between the second rotary element of the first planetary gear device PG1 and the input shaft INPUT, the second clutch CL2 among the shifting elements may form a selective connection between the second rotary element of the first planetary gear device PG1 and the third rotary element of the second planetary gear device PG2, the third clutch CL3 among the shifting elements may form a selective connection between the first rotary element of the second planetary gear device PG2 and the second rotary element of the third planetary gear device PG3, the fourth clutch CL4 among the shifting elements may form a selective connection between the second rotary element of the fourth planetary gear device PG4 and the input shaft INPUT, and the second rotary element of the third planetary gear device PG3 may be fixedly connected to the third rotary element of the fourth planetary gear device PG4.

The first clutch CL1 among the shifting elements may form a selective connection between the second rotary element of the first planetary gear device PG1 and the input shaft INPUT, the second clutch CL2 among the shifting elements may form a selective connection structure between the second rotary element of the first planetary gear device PG1 and the third rotary element of the second planetary gear device PG2, the third clutch CL3 among the shifting elements may form a selective connection structure between the first rotary element of the second planetary gear device PG2 and the second rotary element of the third planetary gear device PG3, the fourth clutch CL4 among the shifting elements may form a selective connection structure between the third rotary element of the fourth planetary gear device PG4 and the output shaft OUTPUT, and the first rotary element of the first planetary gear device PG1 may be fixedly connected to the second rotary element of the fourth planetary gear device PG4.

A vehicular multi-stage transmission in one form of the present disclosure includes: a first planetary gear device PG1, a second planetary gear device PG2, a third planetary gear device PG3, and a fourth planetary gear device PG4, each of the first, second, third and fourth planetary gear devices including first, second and third rotary elements; and seven shifting elements configured to variably provide a frictional force.

The vehicular multi-stage transmission further includes: a first rotary shaft RS1 as an input shaft INPUT fixedly connected to the first rotary element of the first planetary gear device PG1; a second rotary shaft RS2 fixedly connected to the second rotary element of the first planetary gear device PG1; a third rotary shaft RS3 fixedly connected to the third rotary element of the first planetary gear device PG1 and the third rotary element of the second planetary gear device PG2; a fourth rotary shaft RS4 fixedly connected to the first rotary element of the second planetary gear device PG2; a fifth rotary shaft RS5 fixedly connected to the third rotary element of the second planetary gear device PG2, the first rotary element of the third planetary gear device PG3, and the first rotary element of the fourth rotary gear device PG4; a sixth rotary shaft RS6 as an output shaft OUTPUT fixedly connected to the second rotary element of the third planetary gear device PG3 and the third rotary element of the fourth planetary gear device PG4; a seventh rotary shaft RS7 fixedly connected to the third rotary element of the third planetary gear device PG3; and an eighth rotary shaft RS8 fixedly connected to the second rotary element of the fourth planetary gear device PG4.

The first clutch CL1 among the seven shifting elements is disposed between the first rotary shaft RS1 and the second rotary shaft RS2, and the second clutch CL2 is disposed between the second rotary shaft RS2 and the fifth rotary shaft RS5. The third clutch CL3 is disposed between the fourth shaft RS4 and the sixth rotary shaft RS6, and the fourth clutch CL4 is disposed between the first rotary shaft RS1 and the eighth rotary shaft RS8. The first brake B1 is disposed between the second rotary shaft RS2 and the transmission case, the second brake B2 is disposed between the fourth rotary shaft RS4 and the transmission case, and the third brake B3 is disposed between the seventh rotary shaft RS7 and the transmission case.

The first planetary gear device PG1, the second planetary gear device PG2, the third planetary gear device PG3, and the fourth planetary gear device PG4 may be sequentially arranged along the axial direction of the input shaft INPUT and the output shaft OUTPUT.

In addition, the first clutch CL1 is configured to selectively connect the first rotary element of the first planetary gear device PG1 to the second rotary element of the first planetary gear device PG1, the second clutch CL2 is configured to selectively connect the second rotary element of the first planetary gear device PG1 to the third rotary element of the second planetary gear device PG2, the first rotary element of the third planetary gear device PG3, and the first rotary element of the fourth planetary gear device PG4, the third clutch CL3 is configured to selectively connect the first rotary element of the second planetary gear device PG2 to the second rotary element of the third planetary gear device PG3, and the fourth clutch CL4 is configured to selectively connect the first rotary element of the first planetary gear device PG1 to the second rotary element of the fourth planetary gear device PG4.

In another form of the present disclosure, a vehicular multi-stage transmission includes: a first planetary gear device PG1, a second planetary gear device PG2, a third planetary gear device PG3, and a fourth planetary gear device PG4, each of which includes first, second and third rotary elements; and seven shifting elements configured to variably provide a frictional force.

The vehicular multi-stage transmission further includes: a first rotary shaft RS1 as an input shaft INPUT fixedly connected to the first rotary element of the first planetary gear device PG1 and the second rotary element of the fourth planetary gear device PG4; a second rotary shaft RS2 fixedly connected to the second rotary element of the first planetary gear device PG1; a third rotary shaft RS3 fixedly connected to the third rotary element of the first planetary gear device PG1 and the second rotary element of the second planetary gear device PG2; a fourth rotary shaft RS4 fixedly connected to the first rotary element of the second planetary gear device PG2; a fifth rotary shaft RS5 fixedly connected to the third rotary element of the second planetary gear device PG2, the first rotary element of the third planetary gear device PG3, and the first rotary element of the fourth rotary gear device PG4; a sixth rotary shaft RS6 as an output shaft OUTPUT fixedly connected to the second rotary element of the third planetary gear device PG3; a seventh rotary shaft RS7 fixedly connected to the third rotary element of the third planetary gear device PG3; and an eighth rotary shaft RS8 fixedly connected to the third rotary element of the fourth planetary gear device PG4.

Among the seven shifting elements, the first clutch CL1 is arranged between the first rotary shaft RS1 and the second rotary shaft RS2, the second clutch CL2 is arranged between the second rotary shaft RS2 and the fifth rotary shaft RS5. The third clutch CL3 is arranged between the fourth shaft RS4 and the sixth rotary shaft RS6, the fourth clutch CL4 is arranged between the sixth rotary shaft RS6 and the eighth rotary shaft RS8, the first brake B1 is arranged between the second rotary shaft RS2 and the transmission case, the second brake B2 is arranged between the fourth rotary shaft RS4 and the transmission case, and the third brake B3 is arranged between the seventh rotary shaft RS7 and the transmission case.

The first planetary gear device PG1, the second planetary gear device PG2, the third planetary gear device PG3, and the fourth planetary gear device PG4 may be sequentially arranged along the axial direction of the input shaft INPUT and the output shaft OUTPUT.

In addition, the first clutch CL1 is configured to selectively connect the first rotary element of the first planetary gear device PG1 and the second rotary element of the first planetary gear device PG1, the second clutch CL2 is configured to selectively connect the second rotary element of the first planetary gear device PG1, the third rotary element of the second planetary gear device PG2, the first rotary element of the third planetary gear device PG3, and the first rotary element of the fourth planetary gear device PG4, and the third clutch CL3 is configured to selectively connect the first rotary element of the second planetary gear device PG2 and the second rotary element of the third planetary gear device PG3.

The fourth clutch CL4 is configured to selectively connect the second rotary element of the third planetary gear device PG3 and the third rotary element of the fourth planetary gear device PG4.

According to the vehicular multi-stage transmission configured to have the above-described structure, the rotary elements, which constitute the first, second, third and fourth planetary gear sets, are shifted while changing the rotational speed and direction by selective operation of the clutches and the brakes, so that the vehicle can be driven by implementing a gear ratio of 10 or more forward stages and 1 or more reverse stages through such a shifting action.

Therefore, by making the automatic transmission have multiple stages, it is possible to improve fuel efficiency, and by using the operating point in a low RPM zone of the engine, it is possible to decrease the running noise of the vehicle.

Further areas of applicability will become apparent from the description provided herein. It should be understood that the description and specific examples are intended for purposes of illustration only and are not intended to limit the scope of the present disclosure.

DRAWINGS

Figure 2:
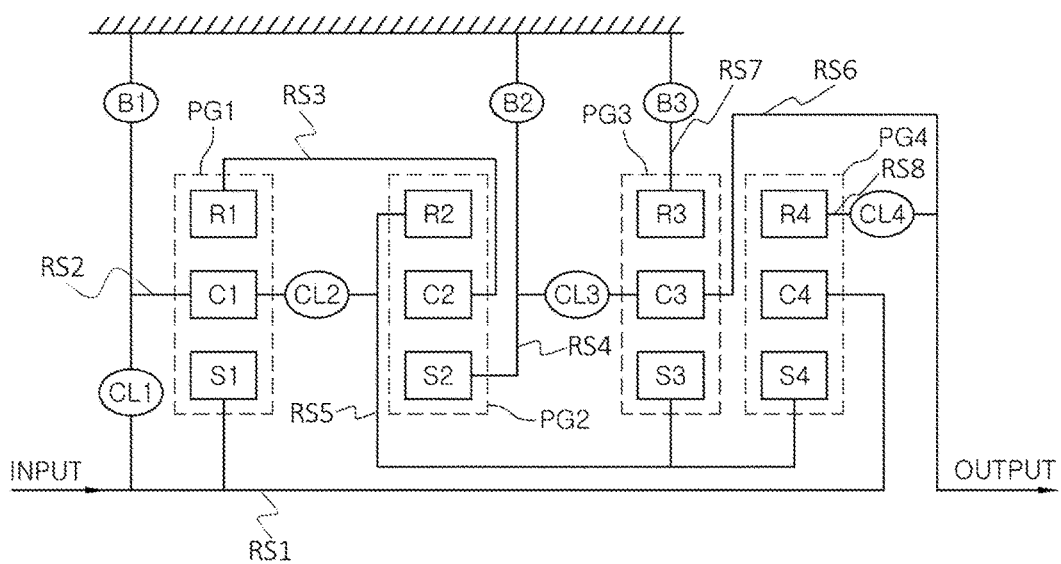

In order that the disclosure may be well understood, there will now be described various forms thereof, given by way of example, reference being made to the accompanying drawings, in which:

FIG. 1 a view schematically illustrating a vehicular multi-stage transmission structure in one form of the present disclosure;

FIG. 2 is a view schematically illustrating a vehicular multi-stage transmission structure in another form of the present disclosure; and FIGS. 3 and 4 are tables representing operations for respective transmission stages of a vehicular multi-stage transmission in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

Here, the term "selectively connected" or the like means at least two members (e.g. a plurality of shafts including the input shaft and the output shaft, or plurality of rotary elements) that are connectable and disconnectable to/from each other, e.g. through at least one intermediate member or a shifting element, and when connected rotate with the same rotational speed, or are connectable to the transmission housing through at least one intermediate member to be fixed to the transmission housing.

FIG. 1 a view schematically illustrating a vehicular multi-stage transmission structure in one form of the present disclosure.

Referring to FIG. 1, a vehicular multi-stage transmission includes: an input shaft INPUT and an output shaft OUTPUT; a first planetary gear device PG1, a second planetary gear device PG2, a third planetary gear device PG3, and a fourth planetary gear device PG4, which are provided to be capable of transmitting torque between the input shaft INPUT and the output shaft OUTPUT and each of which includes three rotary elements; and seven shifting elements connected to the rotary elements of the planetary gear devices.

A first rotary element S1 of the first planetary gear device PG1 is connected to a second rotary element C4 of the fourth planetary gear device PG4 while being fixedly connected to the input shaft INPUT, the second rotary element C1 of the first planetary gear device PG1 is selectively connected to a transmission case by one of the seven shifting elements while being selectively connected to the input shaft INPUT, the secondary rotary element C1 being selectively connected to a third rotary element R2 of the second planetary gear device PG2, a first rotary element S3 of the third planetary gear device PG3, and a first rotary element S4 of the fourth planetary gear device PG4, and the third rotary element R1 of the first planetary gear device PG1 is fixedly connected to a second rotary element C2 of the second planetary gear device PG2.

The first rotary element S2 of the second planetary gear device PG2 is selectively connected to the second rotary element C3 of the third planetary gear device PG3 while being selectively connected to the transmission case by another shifting element of the seven shifting elements.

The second rotary element C3 of the third planetary gear device PG3 is connected to the third rotary element R4 of the fourth planetary gear device PG4 while being fixedly connected to the output shaft OUTPUT, and the third rotary element R3 of the third planetary gear device PG3 is selectively connected to the transmission case by other shifting element of the seven shifting elements.

That is, as the first, second, third, and fourth planetary gear devices are connected between a power input shaft INPUT to which power is input and the power output shaft OUTPUT from which power is output, it is possible to form multiple transmission stages.

In the present disclosure, the first planetary gear device PG1, the second planetary gear device PG2, the third planetary gear device PG3, and the fourth planetary gear device PG4 may be sequentially arranged along the axial direction of the input shaft INPUT and the output shaft OUTPUT.

The second rotary element C1 of the first planetary gear device PG1 may be selectively connected to a transmission case by a first brake B1 among the shifting elements, the first rotary element of the second planetary gear device PG2 may be selectively connected to the transmission case by a second brake B2 among the shifting elements, the third rotary element of the third planetary gear device PG3 may be selectively fixed to the transmission case by a third brake B3 among the seven shifting elements, and the remaining elements among the shifting elements may be provided to form a selective connection between the rotary elements of the four planetary gear devices.

Therefore, the first brake B1 serves to restrain or release the rotation of the second rotary element C1 of the first planetary gear device PG1, the second brake B2 serves to restrain or release the rotation of the first rotary element S2 of the second planetary gear device PG2, and the third brake B3 serves to restrain or release the rotation of the third rotary element R3 of the third planetary gear device PG3.

Meanwhile, in one form of the present disclosure, a first clutch CL1 among the shifting elements may form a selective connection between the second rotary element C1 of the first planetary gear device PG1 and the input shaft INPUT, a second clutch CL2 among the shifting elements may form a selective connection between the second rotary element C1 of the first planetary gear device PG1 and the third rotary element R2 of the second planetary gear device PG2, a third clutch CL3 among the shifting elements may form a selective connection between the first rotary element S2 of the second planetary gear device PG2 and the second rotary element C3 of the third planetary gear device PG3, a fourth clutch CL4 among the shifting elements may form a selective connection between the second rotary element C4 of the fourth planetary gear device PG4 and the input shaft INPUT, and the second rotary element C3 of the third planetary gear device PG3 may be fixedly connected to the third rotary element R4 of the fourth planetary gear device PG4.

According to another form, it is possible to form a multi-stage transmission structure for a vehicle of the present disclosure. FIG. 2 is a view schematically illustrating a vehicular multi-stage transmission structure according to another form of the present disclosure.

Referring to FIG. 2, the first clutch CL1 among the shifting elements may form a selective connection between the second rotary element C1 of the first planetary gear device PG1 and the input shaft INPUT, the second clutch CL2 among the shifting elements may form a selective connection between the second rotary element of the first planetary gear device PG1 and the third rotary element of the second planetary gear device PG2, the third clutch CL3 among the shifting elements may form a selective connection between the first rotary element of the second planetary gear device PG2 and the second rotary element of the third planetary gear device PG3, the fourth clutch CL4 among the shifting elements may form a selective connection between the third rotary element of the fourth planetary gear device PG4 and the output shaft OUTPUT, and the first rotary element of the first planetary gear device PG1 may be fixedly connected to the second rotary element of the fourth planetary gear device PG4.

In the present form, the first rotary element S1, the second rotary element C1, and the third rotary element R1 of the first planetary gear device PG1 are a first sun gear, a first carrier, and a first ring gear, respectively, the first rotary element S2, the second rotary element C2, and the third rotary element R2 of the second planetary gear device PG2 are a second sun gear, a second carrier, and a second ring gear, respectively, the first rotary element S3, the second rotary element C3, and the third rotary element R3 of the third planetary gear device PG3 are a third sun gear, a third carrier, and a third ring gear, respectively, and the first rotary element S4, the second rotary element C4, and the third rotary element R4 of the fourth planetary gear device PG4 are a fourth sun gear, a fourth carrier, and a fourth ring gear, respectively.

The vehicular multi-stage transmission configured as described above may be described as follows.

That is, referring to FIG. 1, a vehicular multi-stage transmission includes: a first planetary gear device PG1, a second planetary gear device PG2, a third planetary gear device PG3, and a fourth planetary gear device PG4, each of which includes three rotary elements; seven shifting elements configured to variably provide a frictional force; and eight rotary shafts connected to the rotary elements of the planetary gear devices.

The first rotary shaft RS1 is an input shaft INPUT that is directly connected to the first rotary element of the first planetary gear device PG1. The second rotary shaft RS2 is directly connected to the second rotary element of the first planetary gear device PG1, the third rotary shaft RS3 is directly connected to the third rotary element of the first planetary gear device PG1 and the second rotary element of the second planetary gear device PG2, and the fourth rotary shaft RS4 is directly connected to the first rotary element of the second planetary gear device PG2. The fifth rotary shaft RS5 is directly connected to the third rotary element of the second planetary gear device PG2, the first rotary element of the third planetary gear device PG3, and the first rotary element of the fourth rotary gear device PG4. The sixth rotary shaft RS6 is an output shaft OUTPUT directly connected to the second rotary element of the third planetary gear device PG3 and the third rotary element of the fourth planetary gear device PG4. The seventh rotary shaft RS7 is directly connected to the third rotary element of the third planetary gear device PG3, and the eighth rotary shaft RS8 is directly connected to the second rotary element of the fourth planetary gear device PG4.

In addition, the first clutch CL1 among the seven shifting elements is disposed between the first rotary shaft RS1 and the second rotary shaft RS2, and the second clutch CL2 is disposed between the second rotary shaft RS2 and the fifth rotary shaft RS5. The third clutch CL3 is disposed between the fourth shaft RS4 and the sixth rotary shaft RS6, and the fourth clutch CL4 is disposed between the first rotary shaft RS1 and the eighth rotary shaft RS8. The first brake B1 is arranged between the second rotary shaft RS2 and the transmission case, the second brake B2 is arranged between the fourth rotary shaft RS4 and the transmission case, and the third brake B3 is arranged between the seventh rotary shaft RS7 and the transmission case.

In addition, the first clutch CL1 is configured to selectively connect the first rotary element S1 of the first planetary gear device PG1 and the second rotary element C1 of the first planetary gear device PG1, the second clutch CL2 is configured to selectively connect the second rotary element C1 of the first planetary gear device PG1, the third rotary element R2 of the second planetary gear device PG2, the first rotary element S3 of the third planetary gear device PG3, and the first rotary element S4 of the fourth planetary gear device PG4, the third clutch CL3 is configured to selectively connect the first rotary element S2 of the second planetary gear device PG2 and the second rotary element C3 of the third planetary gear device PG3, and the fourth clutch CL4 is configured to selectively connect the first rotary element S1 of the first planetary gear device PG1 and the second rotary element C4 of the fourth planetary gear device PG4.

In another form, referring to FIG. 2, a vehicular multi-stage transmission includes: a first planetary gear device PG1, a second planetary gear device PG2, a third planetary gear device PG3, and a fourth planetary gear device PG4, each of which includes three rotary elements; seven shifting elements configured to selectively provide a frictional force; and eight rotary shafts (i.e., first, second, third, fourth, fifth, sixth, seventh and eighth rotary shafts) connected to the rotary elements of the planetary gear devices.

The first rotary shaft RS1 is an input shaft INPUT that is directly connected to the first rotary element S1 of the first planetary gear device PG1 and the secondary rotary element C4 of the fourth planetary gear device PG4. The second rotary shaft RS2 is directly connected to the second rotary element C1 of the first planetary gear device PG1, the third rotary shaft RS3 is directly connected to the third rotary element R1 of the first planetary gear device PG1 and the second rotary element C2 of the second planetary gear device PG2, and the fourth rotary shaft RS4 is directly connected to the first rotary element S2 of the second planetary gear device PG2. The fifth rotary shaft RS5 is directly connected to the third rotary element R2 of the second planetary gear device PG2, the first rotary element S3 of the third planetary gear device PG3, and the first rotary element S4 of the fourth rotary gear device PG4. The sixth rotary shaft RS6 is an output shaft OUTPUT that is directly connected to the second rotary element C3 of the third planetary gear device PG3. The seventh rotary shaft RS7 is directly connected to the third rotary element R3 of the third planetary gear device PG3, and the eighth rotary shaft RS8 is directly connected to the third rotary element R4 of the fourth planetary gear device PG4.

Among the seven shifting elements, a first clutch CL1 is arranged between the first rotary shaft RS1 and the second rotary shaft RS2, and a second clutch CL2 is arranged between the second rotary shaft RS2 and the fifth rotary shaft RS5. A third clutch CL3 is arranged between the fourth shaft RS4 and the sixth rotary shaft RS6, and a fourth clutch CL4 is arranged between the sixth rotary shaft RS6 and the eighth rotary shaft RS8. A first brake B1 is disposed between the second rotary shaft RS2 and the transmission case, a second brake B2 is disposed between the fourth rotary shaft RS4 and the transmission case, and a third brake B3 is disposed between the seventh rotary shaft RS7 and the transmission case.

In addition, the first clutch CL1 is configured to selectively connect the first rotary element S1 of the first planetary gear device PG1 and the second rotary element C1 of the first planetary gear device PG1, the second clutch CL2 is configured to selectively connect the second rotary element C1 of the first planetary gear device PG1, the third rotary element R2 of the second planetary gear device PG2, the first rotary element S3 of the third planetary gear device PG3, and the first rotary element S4 of the fourth planetary gear device PG4, the third clutch CL3 is configured to selectively connect the first rotary element S2 of the second planetary gear device PG2 and the second rotary element C3 of the third planetary gear device PG3, and the fourth clutch CL4 is configured to selectively connect the second rotary element C3 of the third planetary gear device PG3 and the third rotary element R4 of the fourth planetary gear device PG4.

Here, the first planetary gear device PG1, the second planetary gear device PG2, the third planetary gear device PG3, and the fourth planetary gear device PG4 may be sequentially arranged along the axial direction of the input shaft INPUT and the output shaft OUTPUT.

FIGS. 3 and 4 are tables representing operations for respective transmission stages of a vehicular multi-stage transmission according to the present disclosure.

As described above, a vehicular multi-stage transmission including four planetary gear devices and seven shifting elements may implement ten forward stages and one reverse stage according to the operation mode table represented in FIG. 3. Further, it is also possible to implement twelve forward stages and three reverse stages according to the operation mode table represented in FIG. 4. In the form of FIG. 4, it is possible to implement eight forward stages in various ways through the operation of shifting elements.

Therefore, it is possible to realize transmission stages including ten or more forward stages and three or more reverse stages with a relatively small number of components and a simple configuration, thereby contributing to improvement of fuel efficiency and improvement of quietness of the vehicle. Consequently, it is possible to improve the merchantability of the vehicle.

According to the vehicular multi-stage transmission configured to have the above-described structure, the rotary elements, which constitute the first, second, third and fourth planetary gear sets, are shifted while changing the rotational speed and direction by selective operation of the clutches and the brakes, so that the vehicle can be driven by implementing a gear ratio of at least ten forward sages and at least one reverse stage through such a shifting action.

Therefore, by making the automatic transmission have multiple stages, it is possible to improve fuel efficiency, and by using the operating point in a low RPM zone of the engine, it is possible to decrease the running noise of the vehicle.

While the present disclosure has been illustrated and explained in relation to the specific forms thereof, it will be obvious to a person ordinarily skilled in the art that the present disclosure can be variously modified and changed without departing from the scope of the technical idea of the present disclosure.

What is claimed is:

1. A vehicular multi-stage transmission, comprising:
an input shaft and an output shaft;
a first planetary gear device, a second planetary gear device, a third planetary gear device, and a fourth planetary gear device, which are configured to transmit torque between the input shaft and the output shaft, each of the first, second, third and fourth planetary gear devices including first, second and third rotary elements; and
seven shifting elements connected to the rotary elements of the planetary gear devices,
wherein the first rotary element of the first planetary gear device is connected to the second rotary element of the fourth planetary gear device while being fixedly connected to the input shaft,
wherein the second rotary element of the first planetary gear device is selectively connected to a transmission case by a first shifting element of the seven shifting elements while being selectively connected to the input shaft, the secondary rotary element of the first planetary gear device configured to be selectively connected to the third rotary element of the second planetary gear device, the first rotary element of the third planetary gear device, and the first rotary element of the fourth planetary gear device,
wherein the third rotary element of the first planetary gear device is fixedly connected to the second rotary element of the second planetary gear device,
wherein the first rotary element of the second planetary gear device is selectively connected to the second rotary element of the third planetary gear device while being selectively connected to the transmission case by a second shifting element of the seven shifting elements, and wherein the second rotary element of the third planetary gear device is connected to the third rotary element of the fourth planetary gear device while being fixedly connected to the output shaft, and the third rotary element of the third planetary gear device is selectively connected to the transmission case by a third shifting element of the seven shifting elements.

2. The vehicular multi-stage transmission of claim 1, wherein the first planetary gear device, the second planetary gear device, the third planetary gear device, and the fourth planetary gear device are sequentially arranged along an axial direction of the input shaft and the output shaft.

3. The vehicular multi-stage transmission of claim 1, wherein the first shifting element selectively connecting the second rotary element of the first planetary gear device to the transmission case is a first brake, wherein the second shifting element selectively connecting the first rotary element of the second planetary gear device to the transmission case is a second brake, wherein the third shifting element selectively connecting the third rotary element of the third planetary gear device to the transmission case is a third brake, and wherein remaining shifting elements among the seven shifting elements are provided to form a selective connection between the rotary elements of the first, second, third and fourth planetary gear devices.

4. The vehicular multi-stage transmission of claim 3, wherein the remaining shifting elements includes first, second, third and fourth clutches, wherein the first clutch forms a selective connection between the second rotary element of the first planetary gear device and the input shaft, the second clutch forms a selective connection between the second rotary element of the first planetary gear device and the third rotary element of the second planetary gear device, the third clutch forms a selective connection between the first rotary element of the second planetary gear device and the second rotary element of the third planetary gear device, and the fourth clutch forms a selective connection between the second rotary element of the fourth planetary gear device and the input shaft, and wherein the second rotary element of the third planetary gear device is fixedly connected to the third rotary element of the fourth planetary gear device.

5. The vehicular multi-stage transmission of claim 3, wherein the remaining shifting elements includes first, second, third and fourth clutches, wherein the first clutch forms a selective connection between the second rotary element of the first planetary gear device and the input shaft, the second clutch forms a selective connection between the second rotary element of the first planetary gear device and the third rotary element of the second planetary gear device, the third clutch forms a selective connection between the first rotary element of the second planetary gear device and the second rotary element of the third planetary gear device, and the fourth clutch forms a selective connection between the third rotary element of the fourth planetary gear device and the output shaft, and wherein the first rotary element of the first planetary gear device is fixedly connected to the second rotary element of the fourth planetary gear device.

6. A vehicular multi-stage transmission, comprising:

a first planetary gear device, a second planetary gear device, a third planetary gear device, and a fourth planetary gear device, each of the first, second, third and fourth planetary gear devices including first, second and third rotary elements;

seven shifting elements configured to variably provide a frictional force;

a first rotary shaft as an input shaft fixedly connected to the first rotary element of the first planetary gear device, a second rotary shaft fixedly connected to the second rotary element of the first planetary gear device, a third rotary shaft fixedly connected to the third rotary element of the first planetary gear device and the second rotary element of the second planetary gear device, a fourth rotary shaft fixedly connected to the first rotary element of a second planetary gear device, a fifth rotary shaft fixedly connected to the third rotary element of the second planetary gear device, the first rotary element of the third planetary gear device, and the first rotary element of the fourth rotary gear device, a sixth rotary shaft as an output shaft fixedly connected to the second rotary element of the third planetary gear device and the third rotary element of the fourth planetary gear device, a seventh rotary shaft fixedly connected to the third rotary element of the third planetary gear device, and an eighth rotary shaft fixedly connected to the second rotary element of the fourth planetary gear device, and wherein, among the seven shifting elements, a first clutch is disposed between the first rotary shaft and the second rotary shaft, a second clutch is disposed between the second rotary shaft and the fifth rotary shaft, a third clutch is disposed between the fourth shaft and the sixth rotary shaft, a fourth clutch is disposed between the first rotary shaft and the eighth rotary shaft, a first brake is disposed between the second rotary shaft and a transmission case, a second brake is disposed between the fourth rotary shaft and the transmission case, and a third brake is disposed between the seventh rotary shaft and the transmission case.

7. The vehicular multi-stage transmission of claim 6, wherein the first planetary gear device, the second planetary gear device, the third planetary gear device, and the fourth planetary gear device are sequentially arranged along an axial direction of the input shaft and the output shaft.

8. The vehicular multi-stage transmission of claim 6, wherein the first clutch is configured to selectively connect the first rotary element of the first planetary gear device to the second rotary element of the first planetary gear device, wherein the second clutch is configured to selectively connect the second rotary element of the first planetary gear device to the third rotary element of the second planetary gear device, the first rotary element of the third planetary gear device, and the first rotary element of the fourth planetary gear device, wherein the third clutch is configured to selectively connect the first rotary element of the second planetary gear device to the second rotary element of the third planetary gear device, and wherein the fourth clutch is configured to selectively connect the first rotary element of the first planetary gear device to the second rotary element of the fourth planetary gear device.

9. A vehicular multi-stage transmission, comprising:

a first planetary gear device, a second planetary gear device, a third planetary gear device, and a fourth planetary gear device, each of the first, second, third and fourth planetary gear devices including first, second and third rotary elements;

seven shifting elements configured to variably provide a frictional force;

a first rotary shaft as an input shaft fixedly connected to the first rotary element of the first planetary gear device and the second rotary element of the fourth planetary gear device, a second rotary shaft fixedly connected to the second rotary element of the first planetary gear device, a third rotary shaft fixedly connected to the third rotary element of the first planetary gear device and the second rotary element of the second planetary gear device, a fourth rotary shaft fixedly connected to the first rotary element of the second planetary gear device, a fifth rotary shaft fixedly connected to the third rotary element of the second planetary gear device, the first rotary element of the third planetary gear device, and the first rotary element of the fourth rotary gear device, a sixth rotary shaft as an output shaft fixedly connected to the second rotary element of the third planetary gear device, a seventh rotary shaft fixedly connected to the third rotary element of the third planetary gear device, and an eighth rotary shaft fixedly connected to the third rotary element of the fourth planetary gear device, and wherein, among the seven shifting elements, a first clutch is arranged between the first rotary shaft and the second rotary shaft, a second clutch is arranged between the second rotary shaft and the fifth rotary shaft, a third clutch is arranged between the fourth rotary shaft and the sixth rotary shaft, a fourth clutch is arranged between the sixth rotary shaft and the eighth rotary shaft, a first brake is arranged between the second rotary shaft and a transmission case, a second brake is arranged between the fourth rotary shaft and the transmission case, and a third brake is arranged between the seventh rotary shaft and the transmission case.

10. The vehicular multi-stage transmission of claim 9, wherein the first planetary gear device, the second planetary gear device, the third planetary gear device, and the fourth planetary gear device are sequentially arranged along an axial direction of the input shaft and the output shaft.

11. The vehicular multi-stage transmission of claim 10, wherein the first clutch is configured to selectively connect the first rotary element of the first planetary gear device and the second rotary element of the first planetary gear device, wherein the second clutch is configured to selectively connect the second rotary element of the first planetary gear device, the third rotary element of the second planetary gear device, the first rotary element of the third planetary gear device, and the first rotary element of the fourth planetary gear device, wherein the third clutch is configured to selectively connect the first rotary element of the second planetary gear device and the second rotary element of the third planetary gear device, and wherein the fourth clutch is configured to selectively connect the second rotary element of the third planetary gear device and the third rotary element of the fourth planetary gear device.

* * * * *